(12) United States Patent
Czimmek et al.

(10) Patent No.: US 8,678,343 B2
(45) Date of Patent: Mar. 25, 2014

(54) TAU-OMEGA ARMATURE-STATOR CONFIGURATION OF LONG STROKE SOLENOID

(75) Inventors: Perry Robert Czimmek, Williamsburg, VA (US); Michael J. Hornby, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 322 days.

(21) Appl. No.: 12/812,606

(22) PCT Filed: Feb. 17, 2009

(86) PCT No.: PCT/US2009/034230
§ 371 (c)(1),
(2), (4) Date: Jul. 13, 2010

(87) PCT Pub. No.: WO2009/108533
PCT Pub. Date: Sep. 3, 2009

(65) Prior Publication Data
US 2010/0282223 A1  Nov. 11, 2010

Related U.S. Application Data

(60) Provisional application No. 61/066,343, filed on Feb. 19, 2008.

(51) Int. Cl.
*F16K 31/08* (2006.01)
(52) U.S. Cl.
USPC .............. 251/65; 335/255; 335/261; 335/279
(58) Field of Classification Search
USPC ...................... 251/65; 335/255, 261, 262, 279
See application file for complete search history.

(56) References Cited

U.S. PATENT DOCUMENTS

| | | | | |
|---|---|---|---|---|
| 2,348,556 A | * | 5/1944 | Matthias | 335/236 |
| 2,353,835 A | * | 7/1944 | Lane et al. | 335/260 |
| 2,476,794 A | * | 7/1949 | Austin | 335/193 |
| 2,596,409 A | * | 5/1952 | Johnson et al. | 251/77 |

(Continued)

FOREIGN PATENT DOCUMENTS

| | | |
|---|---|---|
| DE | 19847304 A1 | 5/2000 |
| DE | 19904901 A1 | 8/2000 |

(Continued)

OTHER PUBLICATIONS

PCT International Preliminary Report on Patentability in PCT/US2009/034230 dated Aug. 24, 2010.

(Continued)

*Primary Examiner* — John K Fristoe, Jr.
*Assistant Examiner* — Umashankar Venkatesan

(57) ABSTRACT

An armature-stator structure (45) includes a stator (56) having a magnetic housing (57) of generally U-shaped cross-section. The housing includes an open end (58) in communication with an interior portion (60). A coil (94) is associated with the stator and to be energized to generate a magnetic field. An armature (46) has a generally ring-shaped base (48) and a generally rod-shaped stem portion (50) extending transversely from the base such that the base and stem portion define a generally T-shaped cross-section. The base is able to be received in the opened end of the housing with the stem portion extending into the interior portion. The armature moves with respect to the stator from a first position to a second position in response to the generated magnetic field. The stator and armature are configured such that a force on the armature decreases as a portion of the armature moves further into the interior portion of the body of the stator, towards the second position.

12 Claims, 4 Drawing Sheets

(56) References Cited

U.S. PATENT DOCUMENTS

| | | | | |
|---|---|---|---|---|
| 4,452,424 A | * | 6/1984 | Kawata | 251/129.15 |
| 5,565,832 A | * | 10/1996 | Haller et al. | 335/249 |
| 5,875,922 A | * | 3/1999 | Chastine et al. | 222/1 |
| 6,786,467 B2 | * | 9/2004 | Gagnon | 251/129.15 |
| 7,095,304 B2 | * | 8/2006 | Sano et al. | 335/255 |
| 7,825,758 B2 | * | 11/2010 | Bamber | 335/220 |
| 8,215,610 B2 | * | 7/2012 | Shiao et al. | 251/129.16 |
| 2007/0236315 A1 | * | 10/2007 | Adams | 335/229 |

FOREIGN PATENT DOCUMENTS

| | | |
|---|---|---|
| WO | 9612287 A1 | 4/1996 |
| WO | 2006029814 A | 3/2006 |
| WO | 2009105405 A1 | 8/2009 |
| WO | 2009108531 A1 | 9/2009 |
| WO | 2009108532 A1 | 9/2009 |

OTHER PUBLICATIONS

Written Opinion in PCT International Application No. PCT/US2009/034230 dated Aug. 28, 2009.

Search Report in PCT International Application No. PCT/US2009/034230 dated Aug. 28, 2009.

* cited by examiner

TAU-OMEGA ARMATURE-STATOR CONFIGURATION OF LONG STROKE SOLENOID

This application is based on U.S. Provisional Application No. 61/066,343 filed on Feb. 19, 2008, claims the benefit thereof for priority purposes, and is hereby incorporated by reference into this specification.

FIELD

The embodiment relates to a solenoid device and, more particularly, to the configuration of the armature and stator poles of the solenoid device.

BACKGROUND

Automotive applications typically using an air pump, specifically a turbine, supercharger or exhaust driven turbocharger, include gasoline, natural gas or diesel internal combustion engines, benefit from the use of an air bypass valve. Other automotive applications also include fuel cells and fuel reformers, both requiring large volumes of air, and often supplied by a turbine pump and benefit from an air bypass valve. These bypass valves include a solenoid device that has armature and stator poles. FIGS. 1A to 1L show some conventional shapes for basic magnetic cores. For example, the core 10 of FIG. 1A is a rod or cylindrical core, the core 12 of FIG. 1B is an E-core, the core 14 of FIG. 1C is a bar or I-core, the core 16 of FIG. 1D is a toroid or doughnut core, the core 18 of FIG. 1E is a C or U-core, the core 20 of FIG. 1F is a planar core, the core 22 of FIGS. 1G and 1H is a RM core, the core 24 of FIGS. 1L and 1J is a P core, and the core 26 of FIGS. 1K and 1L is an EDT core.

Combinations of core shapes create the various prior art solenoid configurations, such as E-E, EI, C-C, UI, EP, EEM, ER, and ETD. Armature-stator configurations can either be extrusions of the two dimensional representative shape or axis-symmetric revolutions around an axis. FIGS. 2A to 2D show some conventional armature-stator shapes. In particular, FIG. 2A shows an armature 30 and a stator 32 with a central working gap, FIG. 2B shows an armature 34 and a stator 36 with conical profile poles, FIG. 2C shows an armature 38 and a stator 40 with a ⅔ located working gap, and FIG. 2D shows an armature 42 and a stator 44 with a ⅓ located working gap. Although these configurations are useful, there can be improvements in the armature-stator configuration.

Thus, there is a need to provide an improved configuration of armature and stator pole configurations in a solenoid device such that the geometries of the armature and stator poles can be adjusted to various forces as a function of stroke characteristics.

SUMMARY

An object of the present invention is to fulfill the need referred to above. In accordance with the principles of an embodiment, this objective is obtained by providing a solenoid device having a stator assembly including a stator having a generally cylindrical magnetic housing of generally U-shaped cross-section. The housing includes an open end in communication with a hollow, interior portion. The stator assembly also includes a coil, associated with the stator, that is constructed and arranged to be energized to generate a magnetic field. An armature has a generally ring-shaped base and a generally rod-shaped stem portion extending transversely from the base such that the base and stem portion define a generally T-shaped cross-section. The base is able to be received in the open end of the housing with the stem portion extending into the interior portion. The armature is constructed and arranged to move with respect to the stator assembly between a closed position and an open position in response to the generated magnetic field. A spring biases the armature to the closed position. The stator and armature are constructed and arranged such that a force on the armature decreases as a portion of the armature moves further into the interior portion of the body of the stator, towards the open position thereof.

In accordance with another aspect of the embodiment, an armature-stator structure for a solenoid device includes a stator assembly including a stator having a generally cylindrical magnetic housing of generally U-shaped cross-section. The housing includes an open end in communication with a hollow, interior portion. The stator assembly also includes a coil, associated with the stator, that is constructed and arranged to be energized to generate a magnetic field. An armature has a generally ring-shaped base and a generally rod-shaped stem portion extending transversely from the base such that the base and stem portion define a generally T-shaped cross-section. The base is able to be received in the open end of the housing with the stem portion extending into the interior portion. The armature is constructed and arranged to move with respect to the stator from a first position to a second position in response to the generated magnetic field. The stator and armature are constructed and arranged such that a force on the armature decreases as a portion of the armature moves further into the interior portion of the body of the stator, towards the second position thereof.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 3A:
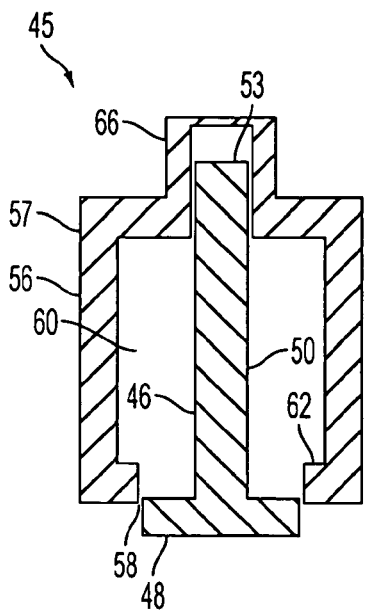
FIG. 3A is a sectional view of an armature-stator structure in accordance with a first embodiment.
Figure 3B:
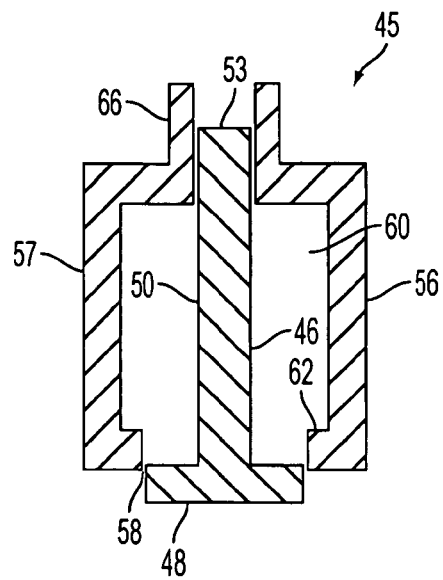
FIG. 3B is a sectional view of an armature-stator structure in accordance with a second embodiment.
Figure 3C:
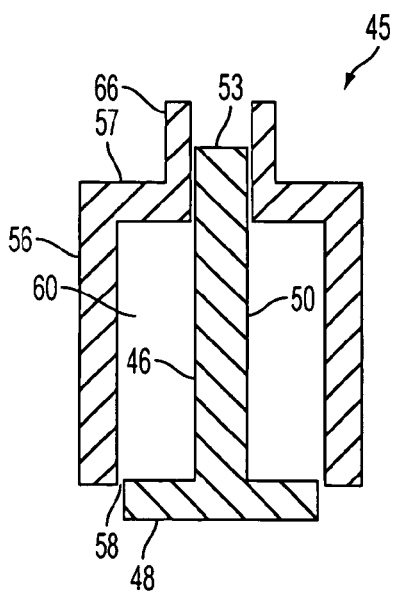
FIG. 3C is a sectional view of an armature-stator structure in accordance with a third embodiment.
Figure 3D:
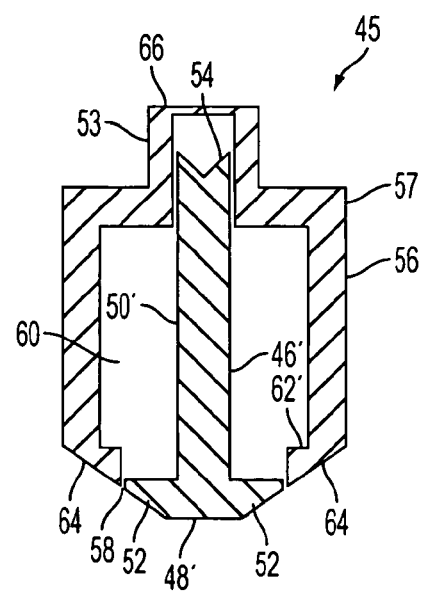
FIG. 3D is a sectional view of an armature-stator structure in accordance with a fourth embodiment.

Referring to FIGS. 3A to 3D, various embodiments of armature-stator structures, generally indicated at 45, are shown. As shown in FIGS. 3A-3C, each armature 46 is of generally "Tau" or T-shaped in section having a generally ring-shaped base 48 and a rod-shaped stem portion 50 extending generally transversely with respect to the base 48. With reference to FIG. 3D, the armature 46' is also of generally "Tau" or T-shaped, having a base 48' and a stem portion 50' extending generally transversely with respect to the base 48', but the base 48 includes chamfers 52 at ends thereof and the distal end of the stem portion includes a notch 54 therein.

As shown in FIGS. 3A-3C, each stator 56 includes a generally magnetic housing 57 of generally "Omega" or U-shaped in section. The housing 57 has an open end 58 that is sized to receive the base 48, 48' of the armature 46, 46' therein. The housing 57 has a hollow, interior portion 60, in communication with the opened end 58, that receives at least a portion of the stem portion 50, 50' of the associated armature 46, 46'. In the embodiments of FIGS. 3A, 3B, and 3D, the distal end of the housing 57 includes a flange 62, 62' extending into the interior portion 60. The distal end and the flanges 62' of FIG. 3D include a chamfer 64. Each stator 56 also includes a guide portion 66 that receives and guides the distal end of the movable armature 46. The guide portion 66 can be closed (FIG. 3A, 3D) or open (FIG. 3B, 3C).

Figure 1A:
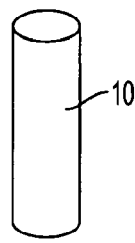
FIG. 1A is a view of a conventional rod or cylindrical core.
Figure 1B:
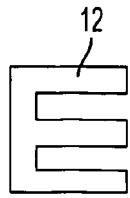
FIG. 1B is a view of a conventional E-core.
Figure 1C:
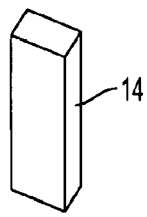
FIG. 1C is a view of a conventional bar or I-core.
Figure 1D:
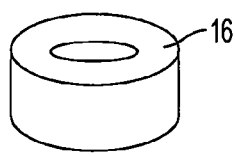
FIG. 1D is a view of a conventional toroid or doughnut core.
Figure 1E:
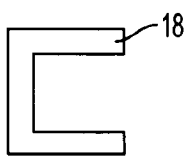
FIG. 1E is a view of a conventional C or U-core.
Figure 1F:
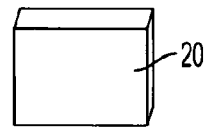
FIG. 1F is a view of a conventional planar core.
Figure 1G:
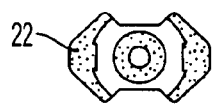
FIG. 1G is a view of a conventional RM core.
Figure 1I:
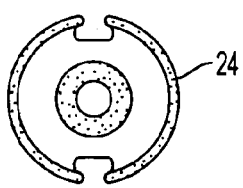
FIG. 1I is a view of a conventional P-core.
Figure 1K:
FIG. 1K is a view of a conventional EDT core.
Figure 1H:
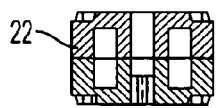
FIG. 1H is a sectional view of the core of FIG. 1G.
Figure 1J:
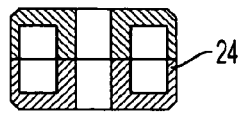
FIG. 1J is a sectional view of the core of FIG. 1I.
Figure 1L:
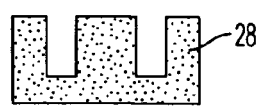
FIG. 1L is a sectional view of the core of FIG. 1K.
Figure 2A:
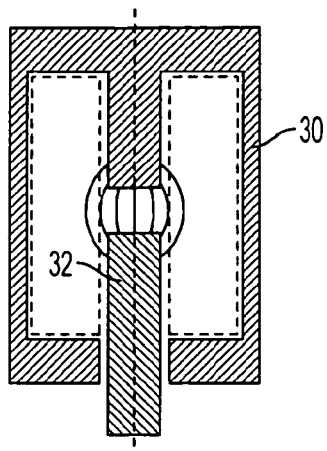
FIG. 2A shows a conventional armature and stator with a central working gap.
Figure 2B:
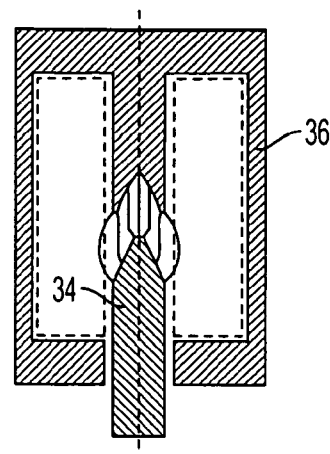
FIG. 2B shows a conventional armature and stator with conical profile poles.
Figure 2C:
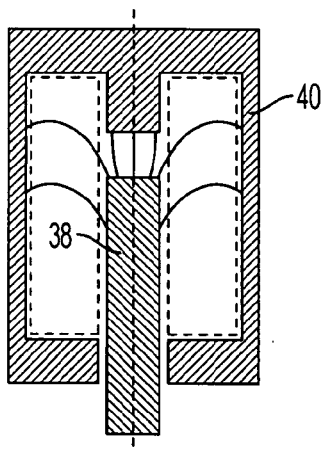
FIG. 2C shows a conventional armature and stator with a ⅔ located working gap.
Figure 2D:
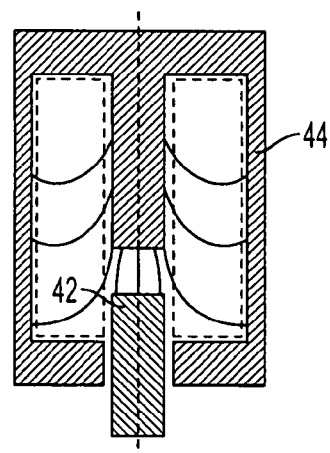
FIG. 2D shows a conventional armature and stator with a ⅓ located working gap.
Figure 4:
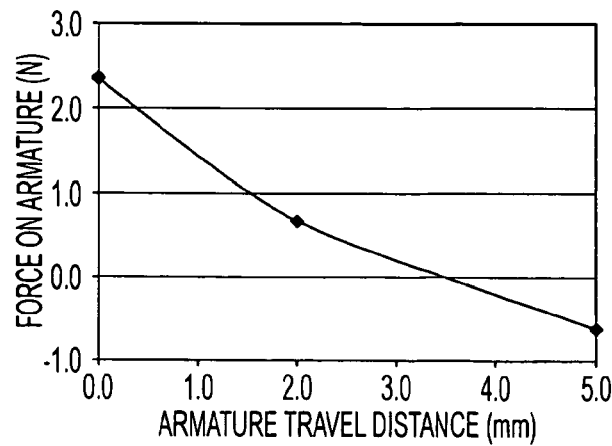
FIG. 4 is a graph of force on the armature, of the armature-stator structure of an embodiment, versus armature travel.

FIG. 4 is a graph of force on the armature 46 versus armature travel. Zero travel distance is the open position of the armature 46 (see FIG. 6) and the 5.0 mm travel distance is the closed position of the armature (see FIG. 5). The graph shows that the force actually decreases as the armature 46 moves into the stator 56, and this is the opposite of what happens with the conventional configurations of FIGS. 2A to 2D. Additionally, the negative force in the graph shows that if the armature 46 over-travels the target position, a force will act in the opposite direction to bring it to the target position and to a neutral force. This is advantageous because the armature 46 will come to rest due to the decrease of magnetic force and not due to a physical stop, thereby eliminating the need for a physical stop and the associated wear, impact and noise.

Figure 5:
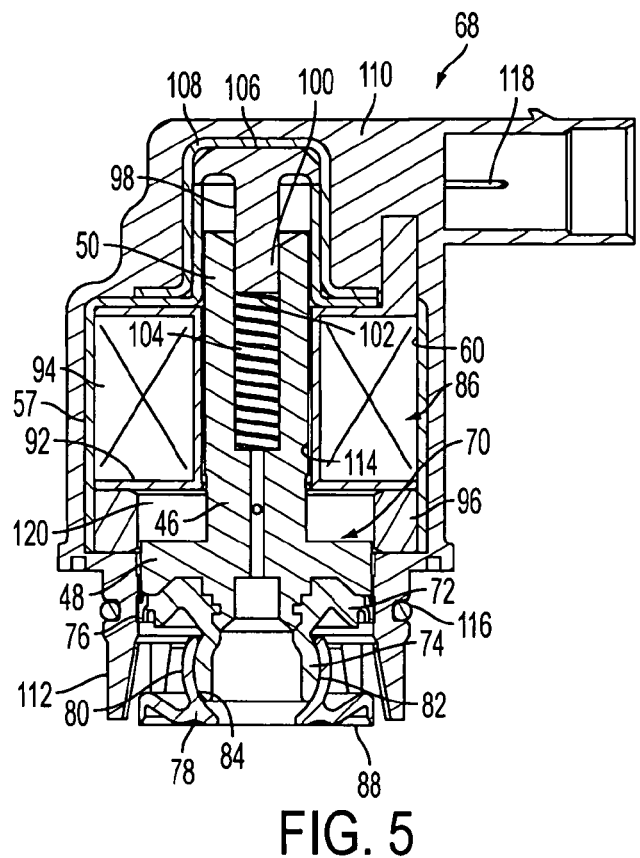
FIG. 5 is a sectional view of a solenoid device employing an armature-stator structure of an embodiment, with the armature shown in a closed position.
Figure 6:
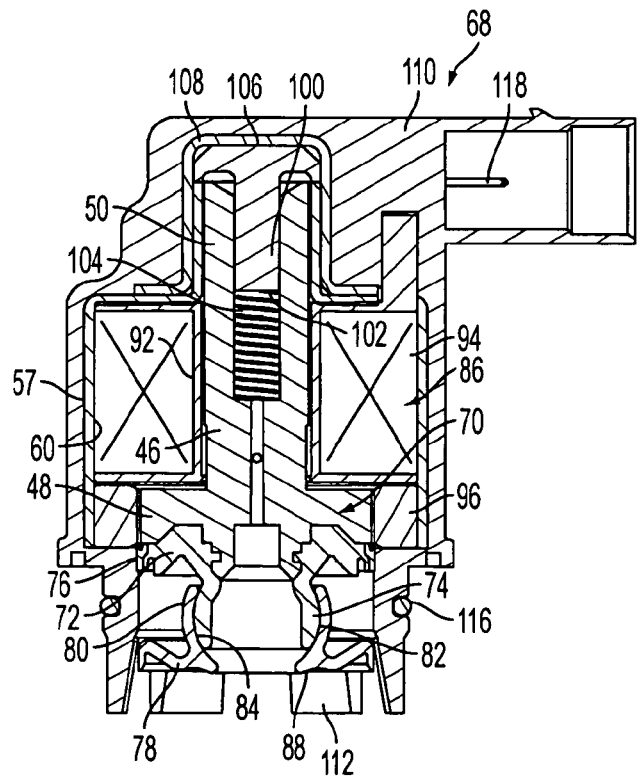
FIG. 6 is a view of the solenoid device of FIG. 5, with the armature shown in an open position.

With reference to FIGS. 5 and 6, a solenoid device, in the form of an air bypass valve for a vehicle, is shown generally indicated at 68, that employs the armature-stator structure 45 of an embodiment. While an air bypass valve is disclosed as the solenoid device 68, other long stroke solenoid applications can benefit from the Tau-Omega armature-stator structure 45 disclosed.

The device 68 includes an armature and seal assembly, generally indicated at 70. The armature and seal assembly 70 is the moving component of the device 68 and includes the armature 46 and a composite, resin or polymer molded pivot gland structure 72 either molded onto the base 48 of the armature 46 or assembled thereto with a mechanical retainer (not shown). Thus, the gland structure 72 can be considered to be part of the armature 46. The gland structure 72 includes a gland member 74, the function of which will be explained below. A dynamic seal 76 of an appropriate material is either incorporated as part of the gland structure 72, co-injection molded therewith, or coupled thereto as a separate component. The dynamic seal 76 reduces air leakage past the armature 46, reducing both air noise and bypass leakage. Finally, a hard seal structure 78, preferably made of similar materials as the gland structure 72, has a pivot member 80 that is preferably snapped together with the gland member 74. The mating co-centric spherical surfaces (external surface 82 of gland member 74 and internal surface 84 of the pivot member 80) form a pivot function such that the seal structure 78 can pivot with respect to the gland structure 72. The 360° pivot function accommodates any dimensional variance from ideal between the axis of a stator assembly 86, mounting face of the complete assembly, and the sealing surface and mounting surfaces of the respective air manifold component to which the device 68 is attached. By accommodating these variances, bypass leak is minimized and durable function of the solenoid maximized in allowing the hard sealing edge 88 of the seal structure 78 to mate with the opposite mounting sealing surface as parallel as possible. It is noted that the inner spherical surface 84 can be part of the gland member 74 with the outer spherical surface 82 being part of the pivot member 80.

The stator assembly, generally indicated at 86, includes the stationary magnetic components of the device 68 and comprises the magnetic (e.g., ferrous) housing 57 that provides a flux return path and a datum enclosure for other parts of the device 68. A coil bobbin 92 is wound with an electromagnet coil 94 of a suitable wire material of an appropriate number of turns to provide the resistance and ampere-turns necessary for proper function with the available control electronics. The coil bobbin 92 with coil 94 is inserted into the housing 57, and a magnetic (e.g., ferrous) flux ring 96 is pressed into the housing 57, retaining the coil bobbin 92 and providing a specific working magnetic pole-type to the armature 46. A spring pin 98 is received in a bore 100 in the stem portion 50 of the armature 46 so that a first end 102 of the spring pin 98 engages a spring 104 and a second end 106 of the spring pin 98 is adjacent to a magnetic end cap 108 such that the spring pin 98 and end cap 108 retain the spring 104. The spring pin 104 provides an axial flux path into the armature 46 as well as guides the closing return spring 104, also in bore 100, in the final assembly. The Omega stator 56 comprises the lump magnetic circuit formed by the magnetic flux ring 96, the magnetic housing 57, the magnetic end cap 108 and, if desired, the spring pin 98. Magnetomotive force for the functioning of the armature-stator structure 45 is provided by the energized coil 94.

As shown in FIGS. 5 and 6, the stator assembly 86 is over-molded with an appropriate polymer or resin to provide the final encapsulation and retention main housing 110 of all stationary parts for the device 68. The main housing 110 provides a customer specified flange (not shown) for mounting by the end user. In addition, the main housing 110 includes impact protection structure that protects the armature and seal assembly 70 from drops and handling, as well as any manifold sealing O-rings. In the embodiment, the impact protection structure includes a plurality of tabs 112 extending in an annular manner at an end of the housing 57 so as to generally surround the seal structure 78 of the armature and seal assembly 70.

In the final assembly steps, the closing return spring 104 is inserted into the armature 46, and the armature and seal assembly 70 is the inserted into the stator assembly 86. More particularly, the stem portion 50 of the armature 46 is received in a bore 114 in the coil bobbin 92. An O-ring 116 provides a seal with respect to an air manifold (not shown) to which the device 68 is attached.

Basic operation of the device 68 will be appreciated with reference to FIGS. 5 and 6. FIG. 5 shows the closed position the device 68 and armature 46 (biased by spring 104) when the electromagnetic coil 94 is not energized via leads 118. In this position, the magnetic gap working area 120 is clearly shown and the sealing edge 88 is an extended position so as to engage with the manifold surface (not shown). FIG. 6 shows the open position of the device 68 and armature 46 when voltage is applied to the coil 94 such that a force on the armature 46 overcomes the force of spring 104. In this position, the sealing edge 88 is a retracted position so as to disengage with the manifold surface (not shown).

Thus, the device 68 is an electronically activated electromagnetic valve whose purpose is to bypass working air from the high pressure side to the low pressure side of a manifold pressure boost pump, turbocharger, supercharger, turbine air pump or similar. The valve 68 utilizes a novel passive internal pressure balancing method, reducing the noise of operation and reducing the force required to both open and close the valve. The air bypass valve 68 provides the functionality for the success, long term operation and efficiency of air boost systems, which depend on responsiveness to dynamic changes and robustness of operation.

The Tau-Omega armature-stator structure 45 allows for characteristics ranging from maximum force at maximum distance and minimum force at minimum distance, to essentially constant force versus distance characteristic, to be incorporated in electromagnetic solenoid devices by changing the geometries of the armature-stator interaction.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A solenoid device comprising:
a stator assembly comprising:
a stator having a generally cylindrical magnetic housing of generally U-shaped cross-section including an open end in communication with a hollow, interior portion, and a flux ring, defining a magnetic pole, coupled to the opened end, the flux ring having an opening there-through,
a coil associated with the stator and constructed and arranged to be energized to generate a magnetic field,
an armature having a generally ring-shaped base of a constant, first diameter and a generally rod-shaped stem portion of a constant, second diameter extending transversely from the base such that the base and stem portion define a generally T-shaped cross-section with the first diameter being substantially greater than the second diameter, the base being able to be received in the opening of the flux ring with the stem portion extending into the interior portion, the armature being constructed and arranged to move with respect to the stator assembly between a closed position and an open position in response to the generated magnetic field, and
a spring biasing the armature to the closed position,
wherein the stem portion of the armature includes a bore, the spring being disposed in the bore,
wherein the stator and armature are constructed and arranged such that a force on the armature decreases as a portion of the armature moves further into the interior portion of the housing of the stator, towards the open position thereof.

2. The device of claim 1, further comprising spring pin having a first end engaging an end of the spring, and magnetic end cap directly adjacent to a second end of the spring pin such that the spring pin provides an axial flux path into the armature and guides the spring.

3. The device of claim 2, wherein the flux ring is engaged with the housing so as to secure the coil within the interior portion.

4. The device of claim 3, wherein the stator comprises the housing, the flux ring and the end cap.

5. The device of claim 1, wherein the device is an air bypass valve for a vehicle, the device further comprising a seal structure coupled with armature so that the seal structure can pivot with respect to the armature, the seal structure having a sealing edge constructed and arranged to seal with a manifold component when the armature is in the closed position thereof.

6. The device of claim 5, wherein the armature includes a gland structure coupled thereto, the gland structure having a gland member defining a generally spherical surface, and the seal structure has a pivot member defining a generally spherical surface that is engaged with the generally spherical surface of the gland member permitting pivoting of the seal structure with respect to the armature.

7. The device of claim 1, wherein the coil is disposed about a bobbin that is received in the interior portion of the housing, the bobbin having a bore there-through, the stem portion of the armature being received in the bore.

8. The device of claim 6, further comprising a dynamic seal associated with the gland structure, the dynamic seal being constructed and arranged to reduce air leakage past the armature.

9. The device of claim 5, further comprising a main housing defining a plastic overmold covering the magnetic housing.

10. The device of claim 5, wherein the main housing includes impact protection structure constructed and arranged to protect the seal structure.

11. The device of claim 10, wherein the impact protection structure includes a plurality of tabs extending in an annular manner from an end of the main housing so as to generally surround the seal structure.

12. An armature-stator structure for a solenoid device comprising:
a stator assembly comprising:
a stator having a generally cylindrical magnetic housing of generally U-shaped cross-section including an open end in communication with a hollow, interior portion, and a flux ring, defining a magnetic pole, coupled to the opened end, the flux ring having an opening there-through, and
a coil associated with the stator and constructed and arranged to be energized to generate a magnetic field, and
an armature having a generally ring-shaped base of a constant, first diameter and a generally rod-shaped stem portion of a constant, second diameter extending transversely from the base such that the base and stem portion define a generally T-shaped cross-section with the first diameter being substantially greater than the second diameter, the base being able to be received in the opening of the flux ring with the stem portion extending into the interior portion, the armature being constructed and arranged to move with respect to the stator from a first position to a second position in response to the generated magnetic field, wherein the stator and armature are constructed and arranged such that a force on the armature decreases as a portion of the armature moves further into the interior portion of the housing of the stator, towards the second position thereof.

* * * * *